(12) United States Patent
Kirschner

(10) Patent No.: US 6,629,678 B1
(45) Date of Patent: Oct. 7, 2003

(54) SEISMIC ADAPTER

(75) Inventor: Kraig A. Kirschner, Corona, CA (US)

(73) Assignee: Automatic Fire Control, Incorporated, South El Monte, CA (US)

( * ) Notice: Subject to any disclaimer, the term of this patent is extended or adjusted under 35 U.S.C. 154(b) by 51 days.

(21) Appl. No.: 09/844,429

(22) Filed: Apr. 27, 2001

(51) Int. Cl.[7] .............................................. A47B 96/06
(52) U.S. Cl. .................................. 248/228.6; 248/72
(58) Field of Search ............................ 248/58, 62, 72, 248/228.6, 228.1, 231.71, 230.6, 610, 612

(56) References Cited

U.S. PATENT DOCUMENTS

| | | | | |
|---|---|---|---|---|
| 661,034 A | * | 11/1900 | Burwinkle | 248/228.1 |
| 1,034,065 A | * | 7/1912 | Binder | 248/228.1 |
| 1,157,441 A | * | 10/1915 | Stevenson | 248/214 |
| 1,282,489 A | * | 10/1918 | Strodel | 101/126 |
| 1,644,899 A | * | 10/1927 | Southgate | 428/581 |
| 1,770,664 A | * | 7/1930 | Woehler | 248/146 |
| 2,611,139 A | * | 9/1952 | Ecklund | 5/505.1 |
| 3,126,182 A | * | 3/1964 | Stamper | 248/72 |
| 3,180,597 A | * | 4/1965 | Havener | 248/68.1 |
| 3,612,461 A | * | 10/1971 | Brown | 248/317 |
| 3,743,228 A | * | 7/1973 | Drab | 248/228.4 |
| 3,874,035 A | * | 4/1975 | Schuplin | 248/228.2 |
| 3,902,931 A | * | 9/1975 | Danciger et al. | 174/163 F |
| 3,998,026 A | * | 12/1976 | Allen | 52/714 |
| 4,570,885 A | * | 2/1986 | Heath | 248/72 |
| D314,503 S | * | 2/1991 | Gilman | D8/394 |
| 5,323,988 A | * | 6/1994 | Handler | 248/317 |
| 5,857,658 A | * | 1/1999 | Niemiec | 248/534 |
| 6,098,942 A | | 8/2000 | Heath | 248/228.6 |
| 6,273,372 B1 | * | 8/2001 | Heath | 248/317 |

* cited by examiner

Primary Examiner—Kimberly Wood
Assistant Examiner—Naschica S. Morrison
(74) Attorney, Agent, or Firm—Fulbright & Jaworski L.L.P.

(57) ABSTRACT

A seismic adapter for attachment to a steel web joist is disclosed. The joist includes two beams with the upper beam having a web depending therefrom. Cord elements extend between the beams at inclined angles. The adapter includes two anchor plates joined at one of the ends of each at a right angle. A mounting plate with a hole extending centrally therethrough is mounted to the anchor plates and extends across the angle on one side thereof. Clamps are arranged at the distal ends of the anchor plates and include an anvil extending from each anchor plate and a threaded hole aligned with the anchor plate to receive a threaded shaft engaged with the threaded hole and extendible to the anvil. The threaded shaft may include a convex end to be received by a concave seat in the anvil to deform thin webs positioned therebetween.

10 Claims, 1 Drawing Sheet

SEISMIC ADAPTER

BACKGROUND OF THE INVENTION

The field of the present invention is building construction hardware for mounting components such as utilities.

Building construction frequently uses steel web joists. Such devices employ two beams. The beams are mutually parallel and spaced apart to create a large moment of inertia for the joist. Cord elements extend at angles between the two so the beams will act as one in bending. Each beam includes a set of two elongate angle elements which are also mutually parallel. The cord elements extend for anchoring to between the elongate angle elements which form a cord space to receive the elements. Each angle element includes two legs extending at a right angle to one another, a first leg which is parallel with the first leg of the other angle element to define the cord space and a second leg extending in the opposite direction from the second leg of the other angle element to generally define a plane. The two first legs extend to define parallel edges at the distal ends of two parallel webs.

Seismic adapters have been associated with such steel web joists through the set screw clamping of brackets to one web of the upper beam of a steel web joist. In this regard, reference is made to U.S. Pat. No. 6,098,942, the disclosure of which is incorporated herein by reference.

Other such seismic adapters now have been associated with such steel web joists by positioning two flat washers about one of the sets of angle elements. One washer lies in the plane of the second legs such that it extends across the cord space in juxtaposition with the second legs. A second washer is arranged to abut against the parallel edges of the first legs, also extending across the cord space. A threaded stud extends between the washers with a nut or bolt head retaining the first washer in juxtaposition with the second legs. The threaded stud extends beyond the second washer to accommodate attachment hardware. The entire assembly is then clamped to the joist by threading a nut up snug against the attachment hardware and, in turn, the second washer. Where access to the top surface of the steel web joist is unavailable, set screw clamps associated with a depending web of the upper beam of the joist may be employed. There are industry requirements that such attachments be within six inches of the attachment point of a cord element with the upper beam. The cord elements typically extend at angles to the upper beam. These elements can interfere with the depending structure of the aforementioned prior devices to limit placement along the joist beam.

SUMMARY OF THE INVENTION

The present invention is directed to a seismic adapter for attachment to the web of an upper beam of a steel web joist. The adapter includes two anchor plates joined together along an edge of each. Clamps oriented to receive the web are arranged at the opposite ends of these plates. A mounting plate is fixed to the anchor plates as well to receive a threaded attachment.

In a first separate aspect of the present invention, the anchor plates are joined together to form an angle substantially less than 180°. The angle provides a close fit adjacent a cord element extending at an angle other than 90° from the upper beam of the joist.

In a second separate aspect of the present invention, each clamp includes an anvil extending from the end of each anchor plate. A threaded hole is aligned with the anvil and receives a threaded shaft extendible to the anvil. The anvil may have a concave seat and the threaded shaft a convex end which can operate on thin webs to deform the web for greater purchase by the clamp.

In a third separate aspect of the present invention, the mounting plate is fixed to the anchor plates. Increased structural rigidity is established through this attachment of the mounting plate.

In a fourth separate aspect of the present invention, the foregoing separate aspects are contemplated to be employed in combination.

Accordingly, it is an object of the present invention to provide an improved seismic adapter. Other and further objects and advantages will appear hereinafter.

DETAILED DESCRIPTION OF THE PREFERRED EMBODIMENT

Figure 4:
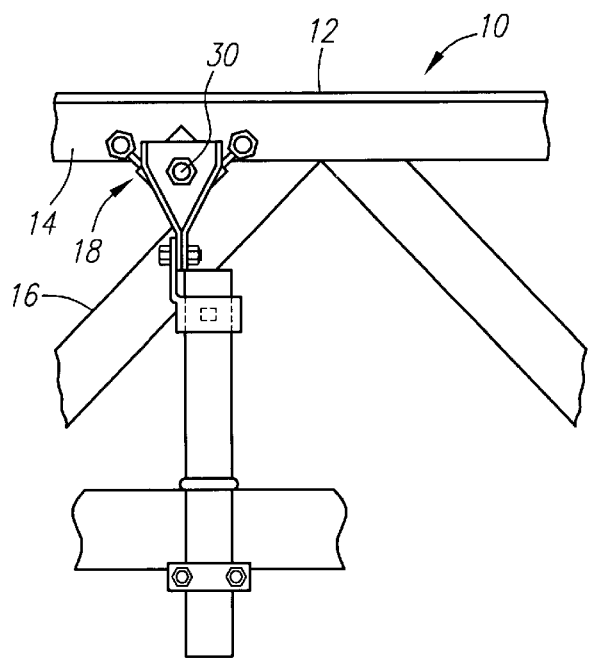
FIG. 4 is a view of the seismic adapter placed on a steel web joist.

Turning in detail to the Figures, the context of the seismic adapter is illustrated in FIG. 4 where a partial view of a steel web joist, generally designated 10, is illustrated. The steel web joist includes an upper beam element 12 with a depending web 14. Cord elements 16 extend diagonally from the upper beam to a lower beam.

Figure 1:
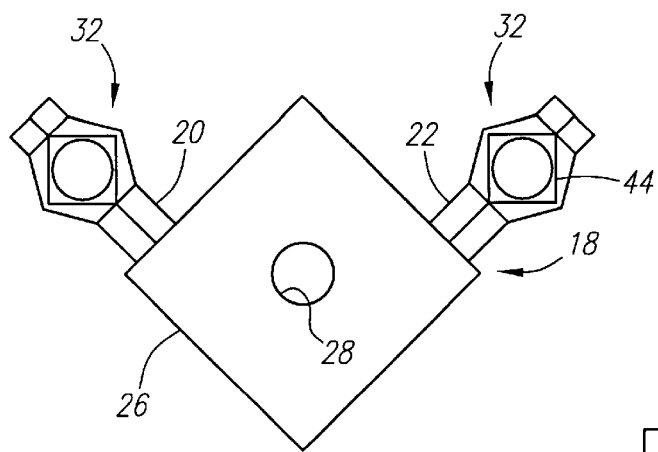
FIG. 1 is a front view of a seismic adapter.
Figure 2:
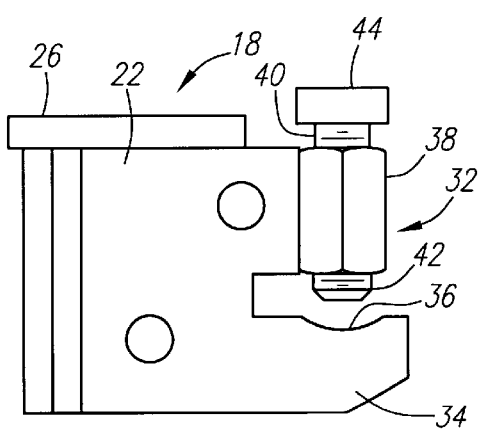
FIG. 2 is a side view of the seismic adapter.
Figure 3:
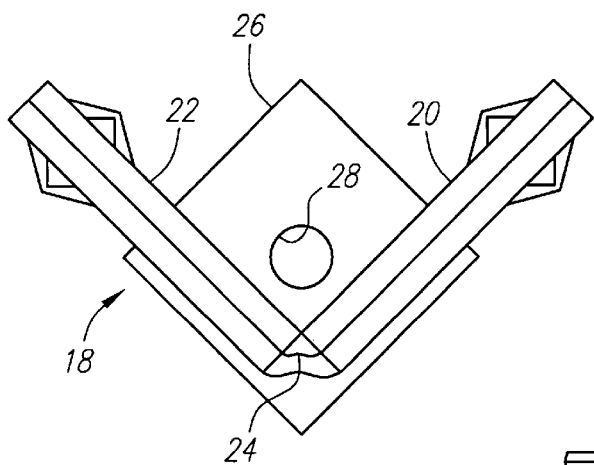
FIG. 3 is a back view of the seismic adapter.

The seismic adapter, generally designated 18, is illustrated in detail in FIGS. 1 through 3. The seismic adapter 18 includes a first anchor plate 20 and a second anchor plate 22. Each of the anchor plates 20 and 22 is conveniently defined by two plates welded together. The anchor plates 20 and 22 defined by the assembled plates are welded to one another along a bead 24 at a first end of each of the anchor plates 20 and 22. The two plates 20 and 22 are arranged at a mutual angle of substantially less than 180°. In the preferred embodiment, this angle is about 90° as illustrated in FIGS. 1 and 3. This angle may vary by several degrees without disabling performance. Rather, the angle is preferably such that the plates 20 and 22 do not interfere with operation of the mounting plate as described below. At the same time, it is preferred that the angle is sufficient that the overall adapter 18 can fit closely within the space defined between the depending web 14 and the cord element 16 as illustrated in FIG. 4.

A mounting plate 26 is fixed to the anchor plates 20 and 22, typically by welding. The plate 26 is square with two adjacent sides of the square being roughly aligned with the anchor plates 20 and 22. A hole 28 extends through the mounting plate 26 and is preferably threaded to receive a threaded fastener 30. The hole 28 preferably avoids the plates 20 and 22 for free movement of the fastener 30. In the preferred embodiment, the hole 28 is centrally located. Through the placement of the mounting plate 26 on the anchor plates 20 and 22, the mounting plate 26 lies in a plane perpendicular to the planes of the anchor plates 20 and 22.

Clamps, generally designated 32, are provided at the end of each of the plates 20 and 22 which is most distant from the end at which the plates are joined together. The clamps 32 are aligned such that they may receive the web 14 within the clamping space. This plane is perpendicular to the anchor plates 20 and 22 and parallel with the mounting plate 26. The clamps 32 each include an anvil 34 extending from the end of the anchor plates 20 and 22. This anvil 34 includes a concave seat 36 into which thin webs 14 may be deformed. A nut 38 is attached by welding to the end of each of the anchor plates 20 and 22 and is aligned with the seat 36 of the anvil 34. A threaded hole extends through the nut 38 to receive a threaded shaft 40. The shaft 40 is extendible to the seat 36 of the anvil 34 and includes a convex end 42 to cooperate with the concave seat 36 in deforming thin webs 14 for greater purchase. Even though the end 42 of the shaft is convex, a dimple may be centrally located in that end as a vestige of the manufacturing process without adverse effect. The shafts 40 may include square heads 44 for application of a wrench to tighten the shaft 40.

In operation, the seismic adapter 18 is positioned with the clamps 32 extending over a web 14. The adapter 18 may be slid into position immediately adjacent a cord element 16 as illustrated in FIG. 4. The shafts 40 are then tightened to clamp the web 14 between the convex ends 42 and the concave seats 36 of the clamps 32. A hanger such as illustrated in FIG. 4 may then be bolted to the mounting plate 26 by a bolt threaded into the centrally positioned hole 28.

Thus, an improved seismic adapter is presented. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A seismic adapter for attachment to a steel web joist including an upper horizontal beam element including a depending vertical web, comprising:

first and second anchor plates each including a first end and a second end opposed to the first end, the first ends being joined together with the anchor plates extending from one another at an angle substantially less than 180°;

clamps at the second ends of the anchor plates, the clamps being aligned to receive the web lying in a first plane perpendicular to the first and second plates;

a mounting plate fixed to the first and second anchor plates and lying in a second plane parallel to the first plane said mounting plate adapted to have a depending element attached thereto.

2. The seismic adapter of claim 1, the mounting plate including a hole centrally extending therethrough.

3. The seismic adapter of claim 1, the clamps each including an anvil extending from the second end of each anchor plate, a threaded hole having an axis aligned with the anvil and a threaded shaft engaged with the threaded hole and extendable to the anvil.

4. The seismic adapter of claim 3, the anvil having a concave seat, the threaded shaft having a convex end facing the concave seat.

5. the seismic adapter of claim 1, the angle being substantially 90°.

6. A seismic adapter for attachment to a steel web joist including an upper beam element including a depending web, comprising:

first and second anchor plates each including a first end and a second end opposed to the first end, the first ends being joined together with the anchor plates extending therefrom at an angle of substantially 90°;

clamps at the second ends of the anchor plates, the clamps being aligned to receive the web lying in a first plane perpendicular to the first and second plates;

a mounting plate fixed to the first and second anchor plates and lying in a second plane parallel to the first plane, the mounting plate being square with two adjacent sides thereof being aligned with and fixed to the first and second anchor plates.

7. A seismic-adapter for attachment to a steel web joist including an upper horizontal beam element including a depending vertical web, comprising:

first and second anchor plates each including a first end and a second end opposed to the first end, the first ends being joined together with the anchor plates extending from one another at an angle substantially less than 180°;

clamps at the second ends of the anchor plates, the clamps being aligned to receive a plate lying in a first plane perpendicular to the first and second plates and each including an anvil extending from the second end of each anchor plate, a threaded hole having an axis aligned with the anvil and a threaded shaft engaged with the threaded hole and extendable to the anvil;

a mounting plate fixed to the first and second anchor plates, lying in a second plane parallel to the first plane and including a hole centrally extending therethrough said mounting plate adapted to have a depending element attached thereto.

8. The seismic adapter of claim 7, the anvil having a concave seat, the threaded shaft having a convex end facing the concave seat.

9. The seismic adapter of claim 7, the angle being substantially 90°.

10. A seismic adapter for attachment to a steel web joist including an upper beam element including a depending web, comprising:

first and second anchor plates each including a first end and a second end opposed to the first end, the first ends being joined together with the anchor plates extending therefrom at an angle of substantially 90°;

clamps at the second ends of the anchor plates, the clamps being aligned to receive a plate lying in a first plane perpendicular to the first and second plates and each including an anvil extending from the second end of each anchor plate, a threaded hole having an axis aligned with the anvil and a threaded shaft engaged with the threaded hole and extendable to the anvil;

a mounting plate fixed to the first and second anchor plates, lying in a second plane parallel to the first plane and including a hole centrally extending therethrough, the mounting plate being square with two adjacent sides thereof being aligned with the first and second anchor plates.

* * * * *